L. BOOTH.
RESILIENT WHEEL.
APPLICATION FILED DEC. 6, 1912.
1,123,671.
Patented Jan. 5, 1915.
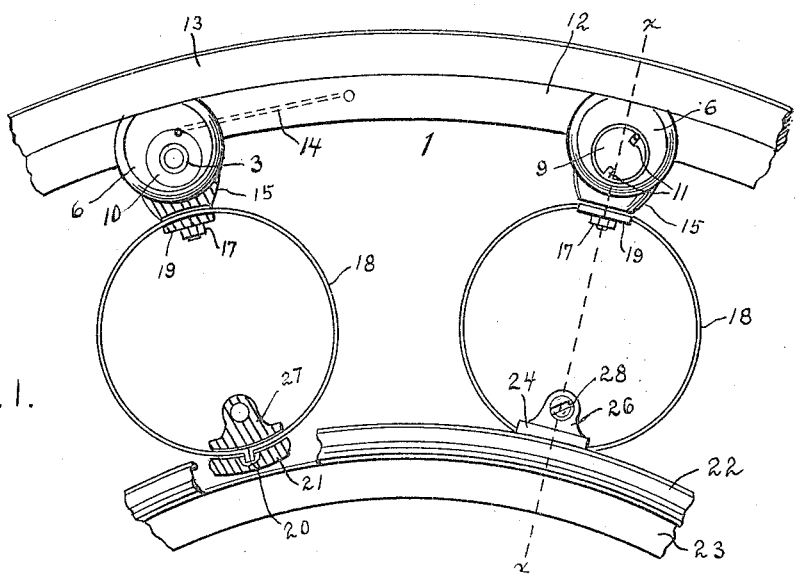
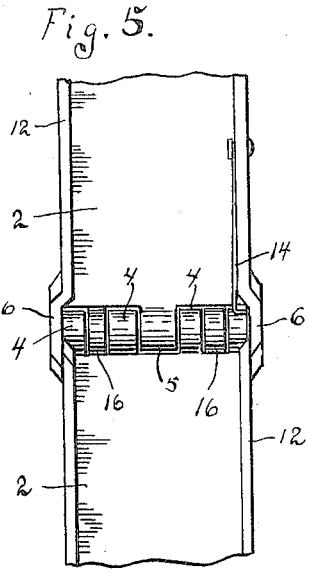
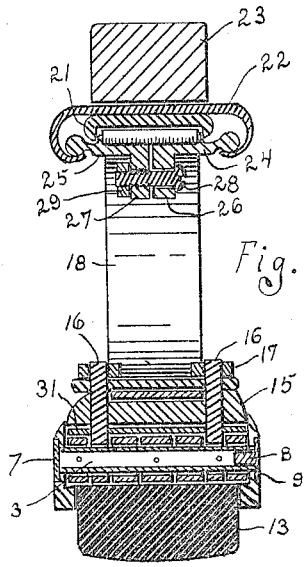
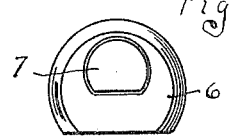
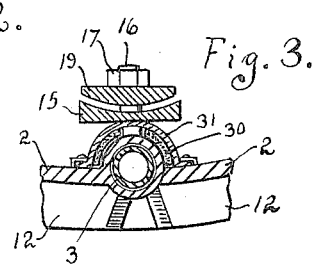
Witnesses
N. B. Coling.
F. J. Ward.
Inventor
Lyman Booth.
By Walter N. Haskell.
Attorney
THE NORRIS PETERS CO., PHOTO-LITHO., WASHINGTON, D. C.

UNITED STATES PATENT OFFICE.

LYMAN BOOTH, OF DIXON, ILLINOIS.

RESILIENT WHEEL.

1,123,671. Specification of Letters Patent. Patented Jan. 5, 1915.

Application filed December 6, 1912. Serial No. 735,253.

*To all whom it may concern:*

Be it known that I, LYMAN BOOTH, a citizen of the United States, residing at Dixon, in the county of Lee and State of Illinois, have invented certain new and useful Improvements in Resilient Wheels, of which the following is a specification.

My invention has reference to wheels for automobiles and similar vehicles, and has for its purpose the provision of a rim for such wheels which will permit of the use of a solid tire of rubber or other suitable material, and at the same time possess the desired amount of resiliency.

My device is specially designed to be substituted for the usual pneumatic tire of inflatable type, but with a little adaptation it can be embodied in a wheel particularly constructed with reference thereto.

In the drawings; Figure 1 shows a section of a wheel embodying my invention, with some of the parts removed. Fig. 2 is a cross-section on the line $x$—$x$ of Fig. 1, with the parts inverted. In Fig. 3 is a cross-section centrally of one of the rim joints. Fig. 4 is an outer face view of one of the plates 6. Fig. 5 is an illustration of a portion of the rim from the lower side thereof, at one of the joints.

Similar parts are indicated by corresponding numbers of reference throughout the several figures.

1 represents an outer rim in its entirety, such rim being constructed of sections 2, united at their ends by means of a hollow pintle 3, passing through knuckles 4 on one of said plates and a knuckle 5 on the opposite plate, said last-named plate being also provided at its end with a pair of guard-plates 6, the inner edges of which are beveled to prevent dirt or other sediment being caught and held thereon. The pintle 3 also passes partly through the plates 6 and is provided at one end with a head 7, and at the opposite end is interiorly threaded and provided with a similarly threaded plug 8, having a head 9 accommodated by a corresponding depression 10 in the plate 6. The head 9 is provided with recesses 11, which may be used in connection with a properly shaped tool to remove the plug 8, or return it to position.

The rim 1 is provided at each side with an outwardly turned flange 12, between which flanges is held a tire 13, preferably constructed of solid rubber. On the inner face of the flange 12 is a spring 14, the free bent end of which passes through a perforation in the plate 6, and is adapted to engage one or other of the recesses 11 and lock the head 9 from turning. When the key is applied to the head 9 to turn the same the end of the spring 14 is forced inwardly, disengaging it from the head.

Each of the joints between the sections 2 is provided with a stirrup 15, pivotally supported on the pintle 3 by means of a pair of I-bolts 16, passing through said stirrup and provided at their outer ends with nuts 17. The ends of the stirrup 15 are beveled to correspond with the edges of the plates 6, and aid in shedding dirt or other material through which the wheel passes. The inner face of the stirrup is concaved, and secured therein is a spring 18, such spring being held in place by means of a plate 19, secured on the bolts 16 beneath the nuts 17. At the opposite side said spring is open, and the ends turned outwardly from such spring, such ends being accommodated in a channel 20 in a plate 21, adapted to be held within the rim 22, usually employed to hold the pneumatic tire, and secured to a felly 23. The spring 18 is held in place against the plate 21 by means of a clamp-plate formed of two parts 24 and 25, having perforated ears 26 and 27, through which passes a bolt 28, provided with a nut 29. The ear 27 is interiorly threaded to engage the bolt 28, and the nut 29 acts as a lock-nut. The ends of the plates 24 and 25 are held by the inwardly turned edges of the rim 22. To place in position said plates are separated and put in place separately, and the ears 26 and 27 then secured to each other. It will be obvious that if desired the spring 18 can be clamped or bolted immediately to the felly 23.

The pintle 3 is provided with a number of small perforations, rendering such part useful as an oil cup, to provide lubricating material between such pintle and the knuckles embracing the same. To prevent the oil from spreading to the other parts of the joint an absorbing pad 30 is provided, held in position by a flexible guard or shield 31, secured to the sections 2 at each side of the joint. Such guard and pad also prevent particles of dirt from entering the joint, which is the only vulnerable part of the mechanism; the large heads 7 and 9 protect the ends thereof, and the tire 13 forms an ample shield for the outer side.

As the joint is the most flexible part of the rim it is considered to be an advantage to have the springs 18 interposed at those points. A further advantage is found in the fact that the pintle of the joint can be employed as a means of support for the stirrup 15, and it is not necessary to furnish a separate support therefor, as would be the case if such springs were introduced at a point midway of the joints. In case of the wheel passing over a large obstruction two or more of the joints will be simultaneously affected, whereas in case of a smaller obstacle the stress will come directly upon one of the joints, or upon one of the sections and be distributed between two of the joints at the ends thereof.

The connection of the springs 18 with the sections 2 by means of the stirrups 15 pivotally supported at the joint of such sections renders such springs less susceptible to the action of such joints, and gives such springs free movement with reference thereto. If the connection between such springs and sections were more rigid the movement of the sections would be directly imparted to the springs, and throw them out of proper position.

The use of clamp-plates to hold the springs 18 to both the inner and outer rims reduces the danger of crystallization of the metal, and also precludes the necessity of cutting or punching any portion of the springs, whereby they would be weakened.

While the springs 18 are shown in form of a circle, the shape thereof may be varied without affecting the operation thereof, and other parts of the device can be changed and adapted without departing from the spirit of the invention.

What I claim as my invention, and desire to secure by Letters Patent of the United States, is:

A resilient wheel, comprising an inner rim; an outer rim, formed of sections provided at their ends with interlocking knuckles; pintles uniting said knuckles; a plurality of collar-shaped springs attached to the inner rim at their inner sides; pairs of clamp-plates embracing said springs at their outer sides; and pairs of bolts uniting said clamp-plates at the sides of the springs, and provided at one end with eyes adapted to engage the pintles of the section joints.

In testimony whereof I affix my signature in presence of two witnesses.

LYMAN BOOTH.

Witnesses:
W. N. HASKELL,
DANA P. MUNN.

Copies of this patent may be obtained for five cents each, by addressing the "Commissioner of Patents, Washington, D. C."